T. E. MURRAY, Jr., AND J. B. MURRAY.
METHOD OF ELECTRIC WELDING.
APPLICATION FILED NOV. 25, 1919.
1,350,831.
Patented Aug. 24, 1920.
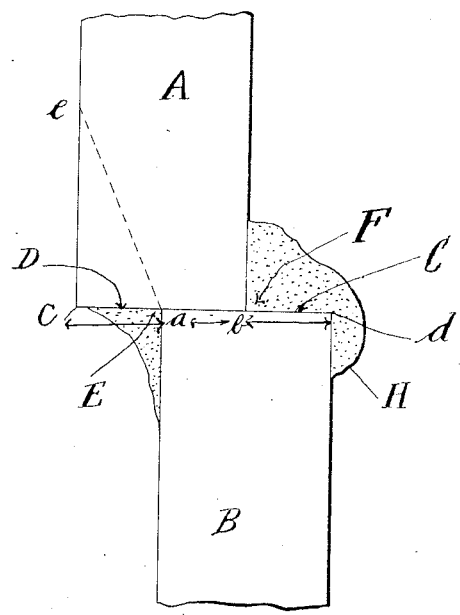
Inventors
Thomas E. Murray Jr.
Joseph B. Murray
By A... Benjamin
Their Attorney

UNITED STATES PATENT OFFICE.

THOMAS E. MURRAY, JR., AND JOSEPH B. MURRAY, OF BROOKLYN, NEW YORK.

METHOD OF ELECTRIC WELDING.

1,350,831. Specification of Letters Patent. Patented Aug. 24, 1920.

Application filed November 25, 1919. Serial No. 340,609.

*To all whom it may concern:*

Be it known that we, THOMAS E. MURRAY, Jr., and JOSEPH B. MURRAY, citizens of the United States, residing at Brooklyn, in the county of Kings and State of New York, have invented a certain new and useful Improvement in Methods of Electrical Welding, of which the following is a specification.

Where two thin plates of metal are to be electrically welded edge to edge, and especially if said plates are bent into half sections of a tube or like hollow object, it is difficult to get an exact registry of said edges when the work is disposed in the electrodes of a welding machine; and even if said registry be obtained at the outset, it is difficult to maintain it when welding currents of high ampere strength and very brief duration are employed. The tendency of the shock or explosion due to said current is to cause a relative movement, or even a certain collapse, of the parts of the work, with the result of throwing the contacting surfaces out of registry. Consequently the weld takes place over the overlapped area only of the surfaces of the parts, and not between the whole area of the said surfaces, and hence the joint is much weaker than would otherwise be the case and, besides, shows sharp ledges.

By our hereinafter described method, we utilize the metal fused and extruded at the joint to fill the angles due to the overlapping. We remove the metal so extruded on one side of the work, but leave the extruded metal on the other side. The consequence is, that to the reduced area of surface contact at the weld is added the area of contact furnished by the extruded metal which is in fact welded to both parts of the work, and hence the whole area of surface contact at the joint is thus restored, the same as if the parts truly registered and did not overlap, as described.

The accompanying drawing is an enlarged view of the parts of the plates to be welded which are adjacent to the welded joint.

A and B are the edge portions of two thin metal plates (shown for clearness here much enlarged) to be welded together at their edges C and D. We will assume that said plates have become out of registry, so that the overlapping occurs at *a, b*—the remainder of each edge, as *a, c* and *b, d*, being uncovered. Obviously, the joint will then measure, say, only one-half of the surface contact area which would be present were the edges in registry.

The welding current being established, the metal extruded from the weld enters the angles at E and F. The extruded metal in angle F is supported by the exposed surface *b, d* of the lower plate B. Therefore, it covers that surface and banks up against the upper plate A; any excess running over the edge about, as shown at H. This extruded metal unites itself to both plates, so that the joint is now over a surface area from *a* to *d*, equal to that which would be present were the edges C, D originally in registry. In making a definite hollow object, for example, as a hollow standard or pedestal, we arrange that the metal in angle F shall be on the inside of the work, and hence not visible. On the outer or exposed side we cut off the extruded metal in angle E, and bevel the upper plate A from *a* to *e*, as indicated by the dotted line.

In this way, we obtain a welded joint quite as strong as obtainable at the edges C and D had they actually been in registry. Where the plates A and B are thin—say, ¼ inch in thickness—the slight protrusion of plate A beyond plate B (purposely exaggerated in the drawing) is not objectionable; and in comparatively large objects such as a pedestal, some three feet high, as commonly used in cream separators, it is hardly noticeable.

We claim:

The method of electrically welding thin metal parts in edge contact and disposed so that the contacting surface of one part overlaps the contacting surface of the other part, which consists in establishing the welding current through the joint to unite said parts and to produce an outflow of extruded metal to fill the angles due to said overlapping, and then removing the metal so extruded on one side of said parts, and beveling the portion of said part protruding beyond the opposite part; whereby the thickness of metal measured transversely across the joint is rendered equal to the normal thickness of said parts.

In testimony whereof we have affixed our signatures in presence of two witnesses.

THOMAS E. MURRAY, JR.
JOSEPH B. MURRAY.

Witnesses:
GERTRUDE T. PORTER,
MAY T. MCGARRY.